(12) United States Patent
Hansler et al.

(10) Patent No.: US 6,946,975 B2
(45) Date of Patent: Sep. 20, 2005

(54) UNIFORMLY LIGHTED AIRFIELD GUIDANCE SIGN

(75) Inventors: Richard L. Hansler, Pepper Pike, OH (US); Glenn Morrow, Westerville, OH (US)

(73) Assignee: Siemens Airfield Solutions, Columbus, OH (US)

( * ) Notice: Subject to any disclaimer, the term of this patent is extended or adjusted under 35 U.S.C. 154(b) by 450 days.

(21) Appl. No.: 10/116,341

(22) Filed: Apr. 4, 2002

(65) Prior Publication Data

US 2003/0201910 A1 Oct. 30, 2003

(51) Int. Cl.[7] .............................. G08G 5/00; B64F 1/18; B64F 1/20
(52) U.S. Cl. .................. 340/947; 340/947; 340/948; 340/949; 340/950; 340/951; 340/952; 340/953; 40/541; 40/605; 40/624; 40/584; 362/26; 362/29; 362/31; 362/32
(58) Field of Search .................. 340/947–956, 340/642, 980; 362/26–32; 40/541–584, 605, 624; 315/130

(56) References Cited

U.S. PATENT DOCUMENTS

| 4,734,625 | A | * | 3/1988 | Geanous et al. | 315/313 |
| 5,426,429 | A | * | 6/1995 | Norman et al. | 340/953 |
| 5,711,589 | A | * | 1/1998 | Oe et al. | 362/31 |
| 6,244,719 | B1 | * | 6/2001 | Oda et al. | 362/31 |
| 6,523,982 | B1 | * | 2/2003 | Haddad | 362/375 |
| 6,552,501 | B2 | * | 4/2003 | Ito et al. | 315/308 |

* cited by examiner

Primary Examiner—Jeffery Hofsass
Assistant Examiner—Lam Pham
(74) Attorney, Agent, or Firm—Tucker Ellis & West LLP (57) ABSTRACT

An airfield guidance sign. The sign 100 (of FIG. 1a) includes a case (102), a multi-element light source (114) attached to the case (102) for providing light interior to the case (102), a light dispersion subsystem of the case for dispersing the light from the light source (114) substantially uniformly throughout the interior of the case (102); and a side panel (126) forming a side of the case (102) for displaying information.

70 Claims, 7 Drawing Sheets

UNIFORMLY LIGHTED AIRFIELD GUIDANCE SIGN

BACKGROUND OF THE INVENTION

1. Technical Field of the Invention

This invention is related to lighted airport runway guidance signs.

2. Background of the Related Art

Airport taxiway and runway guidance signs are an important aspect of total airport operation and safety. With the large increase in consumer domestic and foreign air travel, such signage becomes an even more important aspect for safety on the runways and taxiways as airport congestion increases. The signs need to be readily visible by a pilot or maintenance worker, and lighted sufficiently to be understood at any time of the day or night, and from any angle.

Many conventional guidance signs use a light source that is internal to or on the periphery of the guidance sign such that a message or instruction included on one or more translucent side panels is back-lighted using the light source. These types of signs suffer from a flaw wherein the lighting used therein fails to provide uniform dispersion of the light throughout the interior of the sign case. Thus there are dark regions that affect the readability of the message or instruction presented on the sign.

Additionally, such conventional systems utilize components that require routine maintenance or replacement, for example, the lamps. However, such systems are not designed to be cost effective in that replacement/maintenance requires the technician to perform partial or complete disassembly of the sign case in order to perform the maintenance.

Furthermore, maintenance of such conventional systems can be improved upon by eliminating the need for the technician to make frequent visual inspections to ensure that the light sources are operational. Such improvements can include providing onboard electronics that automatically swaps in a working light source when another fails, and in more robust systems, sends a signal that alerts the technician to the component failure so that maintenance can be performed on a more efficient and cost effective basis.

What is needed is airport guidance signage that provides a uniformly lighted interior, reduces maintenance costs by providing easy access to make replacements or repairs, and can include onboard electronics for sensing component failure, performing replacement action, and providing notification means.

SUMMARY OF THE INVENTION

The present invention disclosed and claimed herein, in one aspect thereof, comprises an airfield guidance sign. The sign includes a case, a multi-element light source attached to the case for providing light interior to the case, a light dispersion subsystem of the case for dispersing the light from the light source substantially uniformly throughout the interior of the case; and a side panel forming a side of the case for displaying information.

BRIEF DESCRIPTION OF THE DRAWINGS

For a more complete understanding of the present invention and the advantages thereof, reference is now made to the following description taken in conjunction with the accompanying drawings, in which.

DETAILED DESCRIPTION OF THE INVENTION

The disclosed sign provides a uniformly lighted interior, reduces maintenance costs by providing easy access to make replacements or repairs, and can include onboard electronics for sensing component failure, performing replacement action, and providing notification means. The sign can be suitably adapted as an airport guidance sign.

Figure 1A:
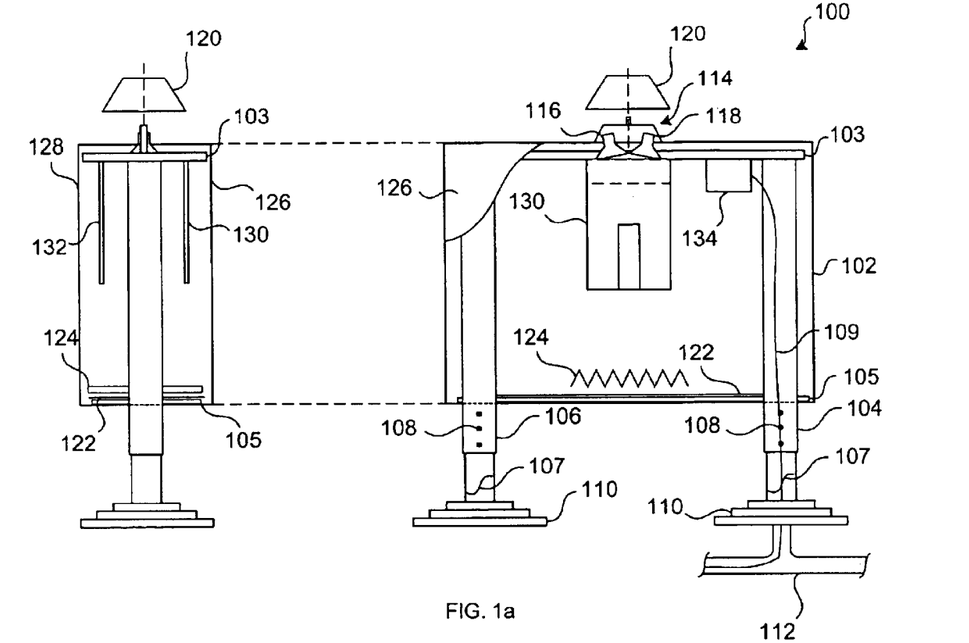
FIG. 1a illustrates a general diagram and isometric of a guidance sign having a single light package and a single modular construction, according to a disclosed embodiment.

Referring now to FIG. 1a, there is illustrated a general diagram and isometric of a guidance sign having a single light package and a single modular construction, according to a disclosed embodiment. The single module sign assembly 100 includes a case 102 that is supported by two support legs (104 and 106) each of which are, e.g., aluminum pipe (Schedule 40), that include adjustment holes 108 so that the single module assembly 102 can be adjusted (or elevated) in height above the surface of the ground. Each leg (104 and 106) includes a frangible groove 107 for providing a breakaway feature should stresses applied to the sign 100 reach a predetermined value, as determined by the design criteria of the groove 107. Each leg (104 and 106) includes a mounting base 110 for securing the sign assembly 100 to a base, e.g., a concrete footing (not shown). In this particular embodiment, leg 104 is illustrated as being the conduit for a power cable 109 carrying power to the electronics of the case 102. Of course, power may be routed to the case 102 in a number of conventional ways, e.g., utilizing an in-ground power conduit 112 that routes power to one or all of the guidance signs being utilized. The case 102 is a modular design that offers the convenience of easily assembling a larger sign, e.g., by simply doubling, tripling, etc., the number of case modules 102. This feature is described in greater detail hereinbelow.

The case 102 accommodates a single light package 114 (or light source) mounted on a top interior single mounting frame 103 that includes two separately operable light elements, or lamps (a first lamp 116 and second lamp 118) for the purposes of redundancy. Note that redundancy is an option in that the second lamp 118 is not required to achieve the desired results. However, the following description includes both the first lamp 116 and the second lamp 118. The first lamp 116 operates while the second lamp 118 is powered off, i.e., ready to be enabled if the first lamp 116 fails. That is, if the first lamp 116 fails, the second lamp 118 is automatically enabled so that the sign assembly 100 provides light at all desired times. This feature is described in greater detail hereinbelow.

The light package 114 is easily accessible by a technician by providing a tool-free access cover 120. The cover 120 can be removed easily by hand to facilitate replacement of the lamps (116 and 118), as necessitated, and is described in greater detail hereinbelow with respect to FIG. 4. Note that the light source 114 need not be located on the top of the case 102, but can be located elsewhere suitable for providing the desired interior lighting.

The interior of the case 102 is coated with a light-reflecting material (e.g., paint) to aid reflection of light to all interior regions of the case 102. Thus the bottom, sides, and ends of the case 102 interior are reflectors that provide 90% reflection and approximately 10% absorption. Additionally, a reflecting mirror 122 is secured to the inside bottom frame 105 of the case 102 (i.e., opposite to the light source 114) to further such reflection of the light from the light package 114. The mirror sheet 122 at the bottom of the sign case 102 is an acrylic, polycarbonate or PETG (Polyethylene Terephtalate Glycol) sheet approximately 0.090–0.130 inches thick, approximately the width of the sign case 102, and secured at several points along the length to the bottom of the sign case 102.

A prism refractor 124 is secured to the inside bottom frame 105 on top of the mirror 122 of the case 102 to facilitate distribution of the light to the corners, and/or regions that are not reached by the previously-described embodied light reflection techniques. The prism refractor 124 is described in greater detail hereinbelow.

The case 102 includes side panels, two side panels (126 and 128) that contain information thereon. The side panels (126 and 128) can be either acrylic or polycarbonate sheets. The side panels (126 and 128) are coated with a retro-reflecting sheet that is visible from the outside, and which also imparts color to the output light. The innermost surface is a white, highly scattering material which helps in obtaining uniformity. The retro-reflective sheeting can be obtained from any supplier of airfield signs. The retro-reflecting characteristic is of value should there be a power failure, since it makes the sign appear bright to the pilot when illuminated by the aircraft or other lights. Note that the sign need not contain information on its side panels, but can simply present a color that indicates to the viewer an instruction or message. Additionally, the case 102 can be circular in construction or any other shape suitable to providing guidance in accordance with the disclosed embodiments. Thus the light dispersion subsystem continued within would be suitable designed to provide dispersion of the light therein.

The 90/10-reflection/absorption results mentioned hereinabove do not of themselves alleviate hot spots (i.e., excessively and/or relatively bright areas) and dark regions throughout the display panel (126 and 128) areas. Thus a pair of panel diffusers (130 and 132) is employed suspended (or fixed) in close proximity with the light package 114 from the top interior member 103 of the case 102. The panel diffusers (130 and 132) include reflective strips and translucency parameters that facilitate the dispersion of light within the case 102 from the light sources (116 and 118). Details thereof are provided hereinbelow with respect to FIG. 2.

The diffusion panels (130 and 132), prism refractor 124, mirror 122, and reflective material of the case interior, provide a light dispersing subsystem within the case interior for dispersing the light from the light source 114 substantially uniformly throughout the interior of the case. When viewed from the outside of the case 102 by a viewer, the side panel information appears clearly recognizable against the uniformly lighted translucent side panel. Note that any of the side panels of the case 102; top, bottom, ends, and sides, can contain different colors or information for viewing. However, it is preferable that the side panels contain the information to be viewed in accordance with the embodiments provided herein.

The sign assembly 100 also includes a light control capability in the form of a power and control module 134. The power and control module 134 is secured within the case 102, and provides power to the light package 114, and remote control capability for remote communication therewith, the details of which are described hereinbelow with reference to FIG. 6. Note that the power-and-control function can be separated into two separate modules fixed within the case 102.

The lamps (116 and 118) are parabolic reflector lamps. Optionally, the reflectors can be ellipsoidal, such that the light image is formed a short distance in front of the reflector.

Figure 1B:
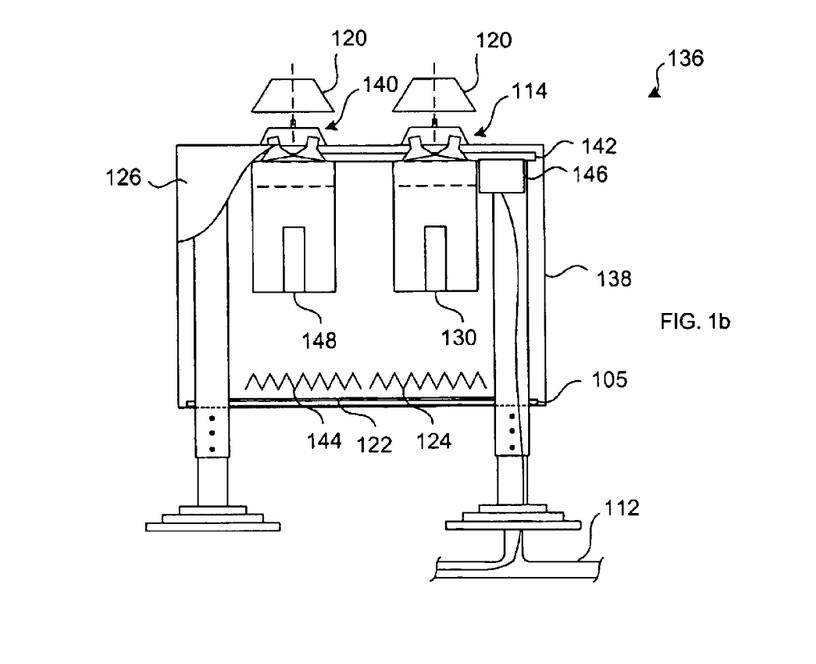
FIG. 1b illustrates a general diagram of a guidance sign having a double light package in a single modular construction, according to a disclosed embodiment.

Referring now to FIG. 1b, there is illustrated a general diagram of a guidance sign 136 having a double light package in a single modular construction, according to a disclosed embodiment. In this particular embodiment, the case 138 includes a double light package, that is, the first light package 114 and a second light package 140. The design of the case 138 is similar to the construction of the case 102, with the simple change that the top single mounting frame 103 of FIG. 1a is replaced with a double mounting frame 142 in which the light packages (114 and 140) are secured. Such an embodiment may be utilized where the side panels 126 (and 128, not visible) include colors and text that require higher levels of interior background light for the panel information to be viewed. The light packages (114 and 140) are positioned in accordance with respective prism refractors, i.e., the first prism refractor 124, and a second prism refractor 144. The reflecting mirror 122 of FIG. 1a is suitably designed to be used in the case 138 of FIG. 1b to accommodate both the prism refractors (124 and 144), such that both can be secured to the bottom frame 105 of the case 138 through mounting holes (not shown) in the mirror 122.

Since the power load is increased when using the two light packages (114 and 140), a more robust power and control module 146 (similar to power and control module 134) can be utilized to control operation of the two light packages (114 and 140). It is appreciated that the power and control modules 134 of FIG. 1a, and power and control module 146, can be the same modules, since the added power capability required to power the second light package 140 may be covered in the design capability of the power and control module 134 to handle the single light package 114.

The double light package embodiment includes the separate first prism refractor 124 associated with the first light package 120, and the second prism refractor 144 for the second light package 140. Additionally, the second light package 140 has associated therewith a second set of diffuser panels 148 (the back diffuser panel not viewable, but similar to diffuser panels 130, 132, and 148). Thus the double set of light packages (114 and 140), diffuser panels (130 and 148), and prism refractors (124 and 144) offer a much brighter and uniform interior background light for more demanding applications. Note that the embodiment of FIG. 1b also includes the power conduit routing of FIG. 1a for routing power from the in-ground power conduit 112 to the power and control module 146.

Figure 1C:
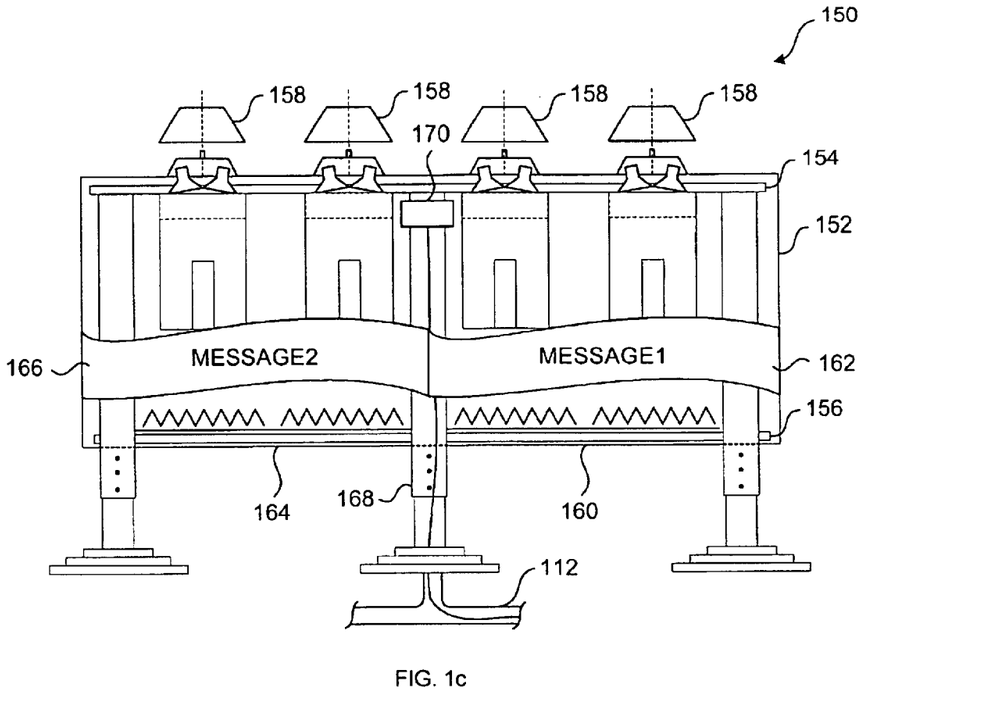
FIG. 1c illustrates a general diagram of a guidance sign in a double modular construction with twin light packages, according to a disclosed embodiment.

Referring now to FIG. 1c, there is illustrated a general diagram of a guidance sign 150 in a double modular construction with twin light packages, according to a disclosed embodiment. The novel extensible construction is suitably designed to conveniently scale to larger applications. Thus where messages (or information) for presentation require more message panel space, and the affiliated color scheme and application require more background light, the illustrated double modular guidance sign 150 essentially doubles the case capabilities of FIG. 1b, while providing a reduced leg support structure over conventional implementations (i.e., three versus four). The modular design of the case 152 of the sign 150 and associated component hardware simply require a change in the top interior case frame 154 and bottom interior case frame 156 to accommodate the increased number of light packages 158 (similar to light package 114) and the three-support leg orientation. Thus a single message may be presented across both individual message panels (162 and 166) or provided on a single message panel that extends the length of the case 152. Of course, if the particular application is more conducive to a single message panel extending the length of the double modular case 150, this can be implemented as well. The modularity of the case design facilitates constructing a multi-case sign wherein adding an additional case only requires adding one support leg.

Alternatively, the extensible construction allows the implementation of multiple message formats. For example, a first case module 160 of the case 152 can be used to present a first message MESSAGE1 on a first panel 162 having a first panel color, and the second case module 164 can have a second message MESSAGE2 on a second message panel 166 with a different color scheme. Thus instead of a single message panel that extends the length of the case construction, two separate and easily replaceable message panels can be implemented per case 150. Furthermore, the multi-case design allows multiple respective side panels of different colors, and different information.

Additionally, the novel modular construction is suitably adaptable to mix and match light configurations accordingly to the particular needs of the user, wherein the first case module may contain a single light package while the second case module contains the double light package (this embodiment is not illustrated).

Power distribution for the embodiment of FIG. 1c can be routed according to the desires of the user. Here, the power is routed up a center support leg 168 from the in-ground conduit 112 to distribute power and control signals accordingly to a power and control module 170 (similar to power and control modules 134 and 146).

Figure 1D:
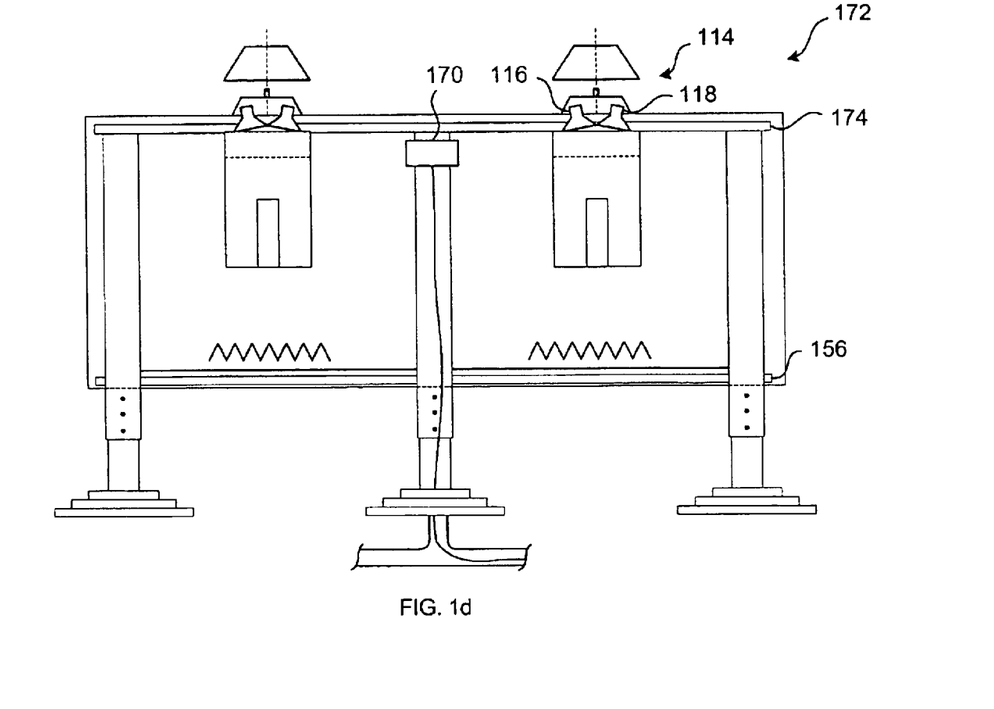
FIG. 1d illustrates a general diagram of a guidance sign in a double modular construction with single light packages, according to a disclosed embodiment.

Referring now to FIG. 1d, there is illustrated a general diagram of a guidance sign 172 in a double modular construction with single light packages, according to a disclosed embodiment. The construction herein is similar to that of FIG. 1c, except that a top interior case frame 174 now accommodates single light packages, instead of the twin sets of light packages of FIG. 1c. Accordingly, each light package has an associated prism refractor and access cover. Each light package is powered according to the layout of FIG. 1c.

Note that the lamp sets are tilted to direct the light to the center of the case. For example, the first lamp package 114 includes the first lamp 116 and the second lamp 118. The first lamp 116 is tilted inward at an angle of approximately 3.8 degrees, where the tilt angle ranges from 3.0–4.5 degrees. Similarly, the second lamp 118 is tilted toward the center of the case at the similar angle, such that both lamps (166 and 118) direct light to the center of the case. The precise angle of tilt depends, of course, on the height of the sign.

As mentioned hereinabove, the power and control module 170 functions to control sets of lamps. Thus, for example, where a first set of lamps are operatively connected and powered on a first circuit, and one of the lamps in the first set fails, the first set is powered off, and a second set is powered on. In actual practice, however, the second set may be powered on before the first set is powered off, so that continued lighting is provided. Of course, where both sets are powered simultaneously, the input power requirements, and capabilities of the power and control module 170 needs to be considered accordingly.

Figure 2:
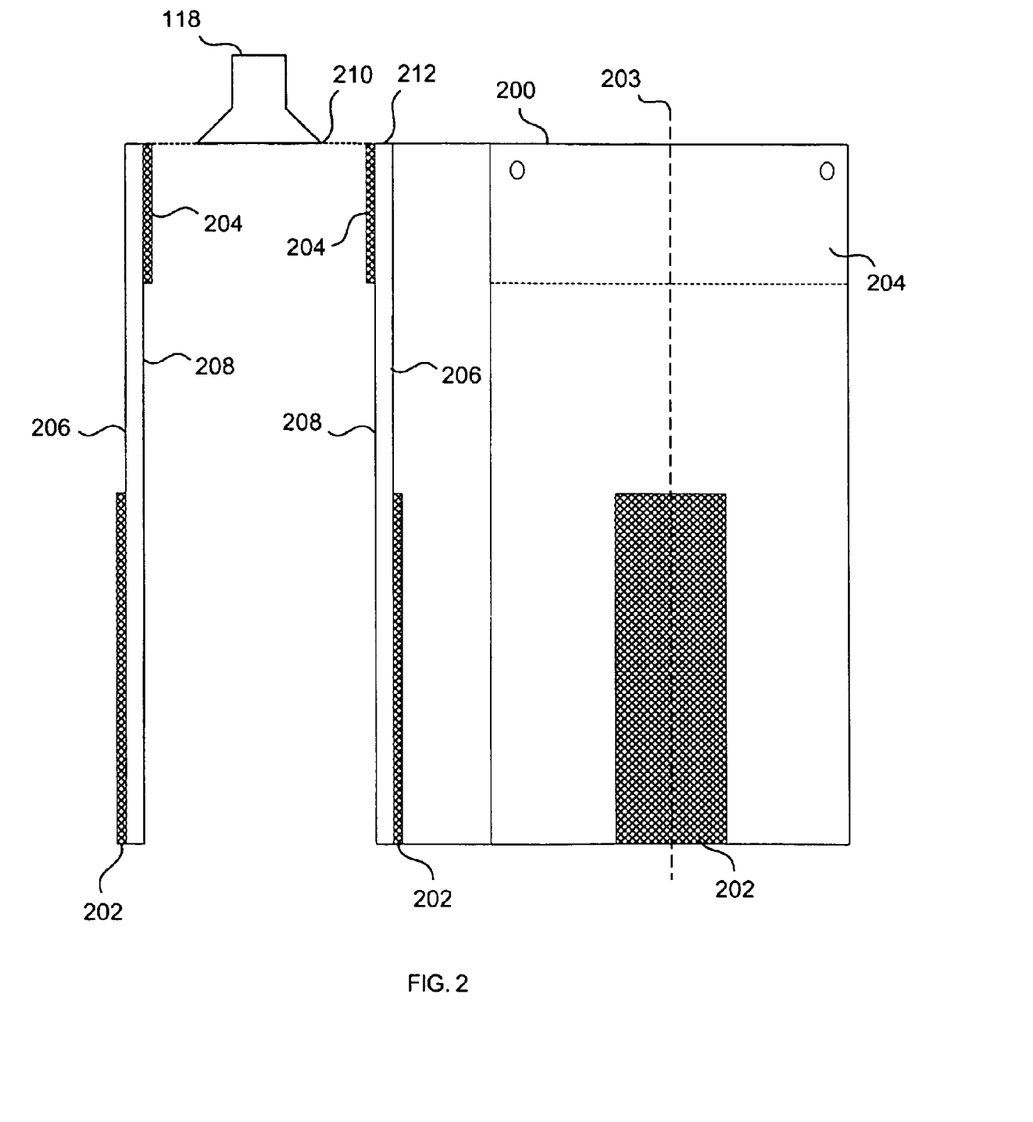
FIG. 2 illustrates a diagram of a panel diffuser and arrangement.

Referring now to FIG. 2, there is illustrated a diagram of a panel diffuser 200 (similar to panel diffuser 130) and arrangement. The function of the panel diffuser 200 (also denoted a "hot spot" panel) is to reduce hot spots and to aid in diffusing light to dark regions. The hot spot panel 200 is a translucent white acrylic sheet having dimensions of approximately 7.5 inches wide by 15 inches long, and a thickness ranging from 0.110–0.125 inches of 20% translucent material. A lower vertical reflector strip 202 and an upper horizontal reflector strip 204 are painted on the panel 200 utilizing a chrome aluminum enamel or equivalent. The lower vertical strip 202 is approximately 10 inches by 2 inches, and positioned symmetrically about the illustrated centerline 203, defined along the length of the panel 200. The lower vertical strip 202 is painted on the exterior side 206 of the panel 200 (i.e., away from the lamp 118) such that it faces the message panel. The upper horizontal strip 204 measures approximately 3 inches by 7.5 inches, and is painted on the interior side 208 (i.e., toward the lamp 118) of the panel 200.

The diffuser panel 200 and associated lamps are positioned such that the bottom 210 of the lamp 118 is aligned to the top 212 of the diffuser panel 200. This relationship is applied to both diffuser panels, which are positioned on either side of the lamp 118, and between the light 118 and respective side panels. Additionally, for this particular type of lamp 118, the distance between the panels 200 from the interior side 208 is in the range of approximately 2.250–2.375 inches. Note also that although the painted upper strip 204 is illustrated as reaching the upper edge 212 of the panel 200, the upper strip 204 can be applied such that it is placed away from the edge 212, so long as its desired function is realized, that is, to avoid the appearance of a region of higher brightness (hot spot) on the face of the sign.

Of course, if the case and light source in which the diffuser panels are used change in dimensions or type, the dimensions of the diffuser panel 200 are suitably adjusted to provide the desired result.

Figure 3:
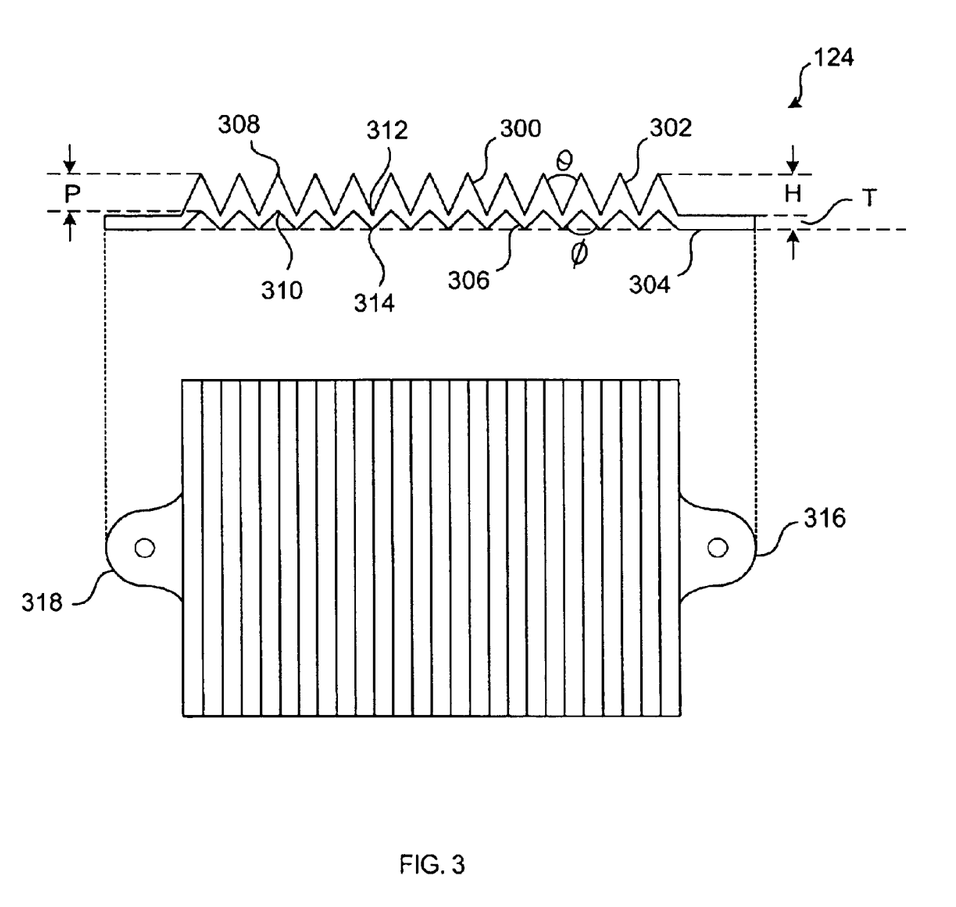
FIG. 3 illustrates a diagram of the prism reflector.

Referring now to FIG. 3, there is illustrated a diagram of the prism refractor 124. The prism refractor 124 functions to distribute light to dark regions within the case where reflected light does not normally reach, without such a device. The refractor 124 is an extruded/molded acrylic sheet with a multi-angled surface. The top side 300 includes a series of V-shaped depressions 302 having an angle $\theta$ of approximately 58.1 degrees. The bottom side 304 includes a series of V-shaped depressions 306 having an angle $\phi$ of approximately 90 degrees. The bottom and top side depressions (302 and 306) are aligned "in phase" such that a peak 308 of a top side angle 308 aligns with a peak 310 of the bottom side angle, and the corresponding troughs (312 and 314) align similarly.

The prism refractor 124 has an overall height H of approximately 0.530 inches, with a peak-to-peak distance P between the V-shaped depressions (302 and 306) of approximately 0.311 inch, and the trough-to-trough distance T of approximately 0.080 inch. The prism refractor 124 is approximately 6.5 inches in length and 4.5 inches in width, and constructed of clear acrylic, or its equivalent. It includes two bolt-down tabs (316 and 318), one at each end, for securing to the base of the sign case. Note that the prism refractor 124 can be designed where the two sides have the same angle, however, the refracting characteristics are less desirable.

In operation, light emitted downward from the lamp 118 impacts the high angle depressions 302 of the top side 300 and is partially reflected to the lower regions (or corners) of the case 102. Light passing through the prism refractor 124 to the underlying mirror 122 is reflected back to the prism refractor 124, striking the lower-angled depressions, and directed upward to the upper regions (or corners) of the case 102. Of course, if the dimensions of the case 102 were designed to be different, the design angles ($\theta$ and $\phi$) of the prism refractor 124 could be altered accordingly to direct light the darker regions of the case having the different dimensions. Such design angles can be obtained by performing optical modeling on a computer using optical modeling software. Light control films may also be used such as those made by the 3M company which reflect light at a large angle compared to the direction of the incident light. They need to be oriented to send light to the corners of the sign, i.e., parallel to the face of the sign.

Figure 4:
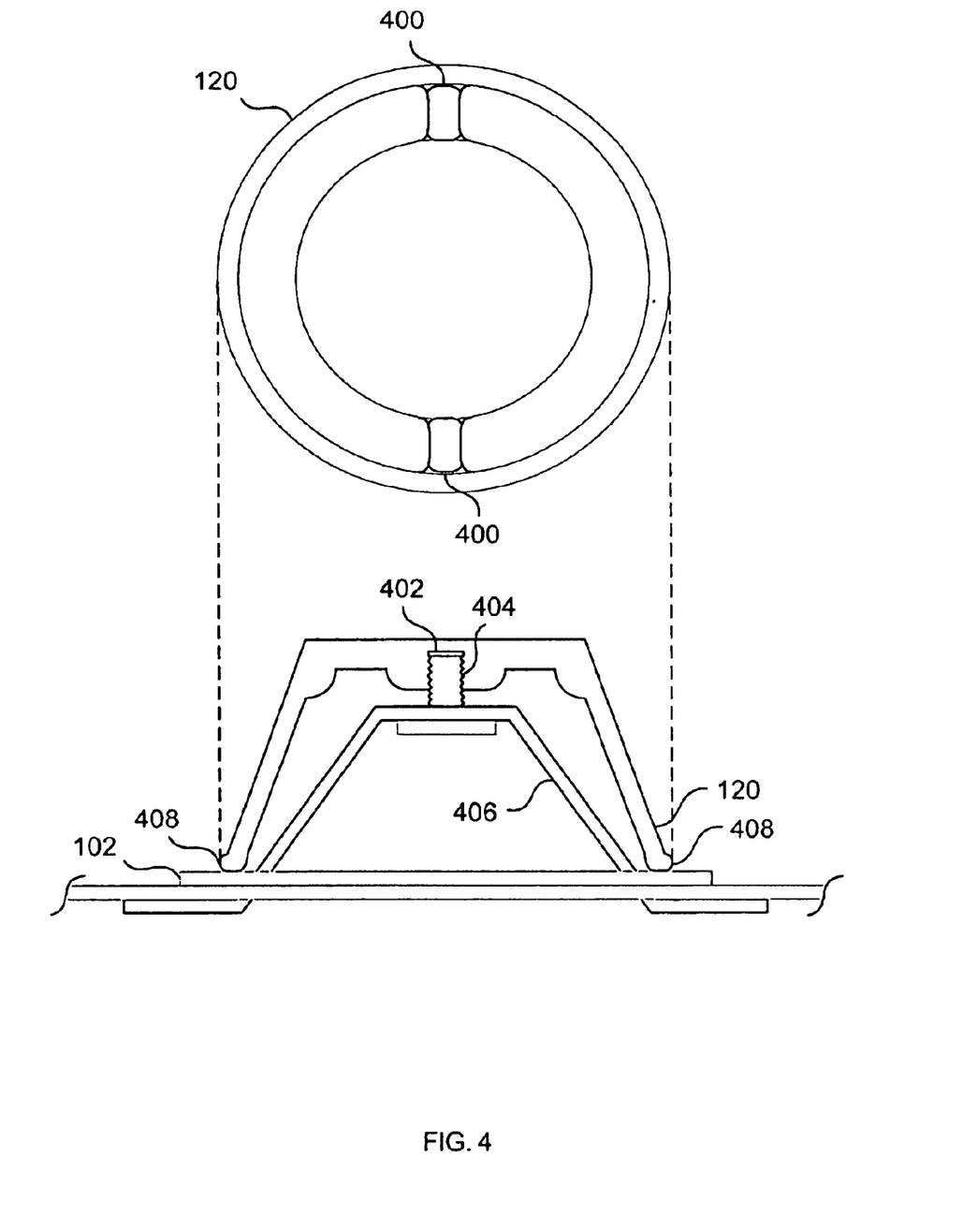
FIG. 4 illustrates a diagram of the tool-free access cover and associated frame assembly.

Referring now to FIG. 4, there is illustrated a diagram of the tool-free access cover 120 and associated frame assembly. The cover 120 is circular in design having opposing ears 400 that function as grips for tightening or loosening the cover 120 from the case 102. The cover 120 includes a recessed threaded portion 402 for screwing onto a threaded rod 404 of a mating bracket 406. The design is such that when the cover 120 is tightly secured, a lower lip portion 408 of the cover 120 is in compressed contact with the case 102, providing a tight seal for preventing undesirable elements, e.g., rain, dust, etc., from entering the case 102 from the cover area. As mentioned hereinabove, if the light source 114 were mounted on a side of the case, the tool-free cover would follow the light source 114 and be mounted therewith.

Figure 5:
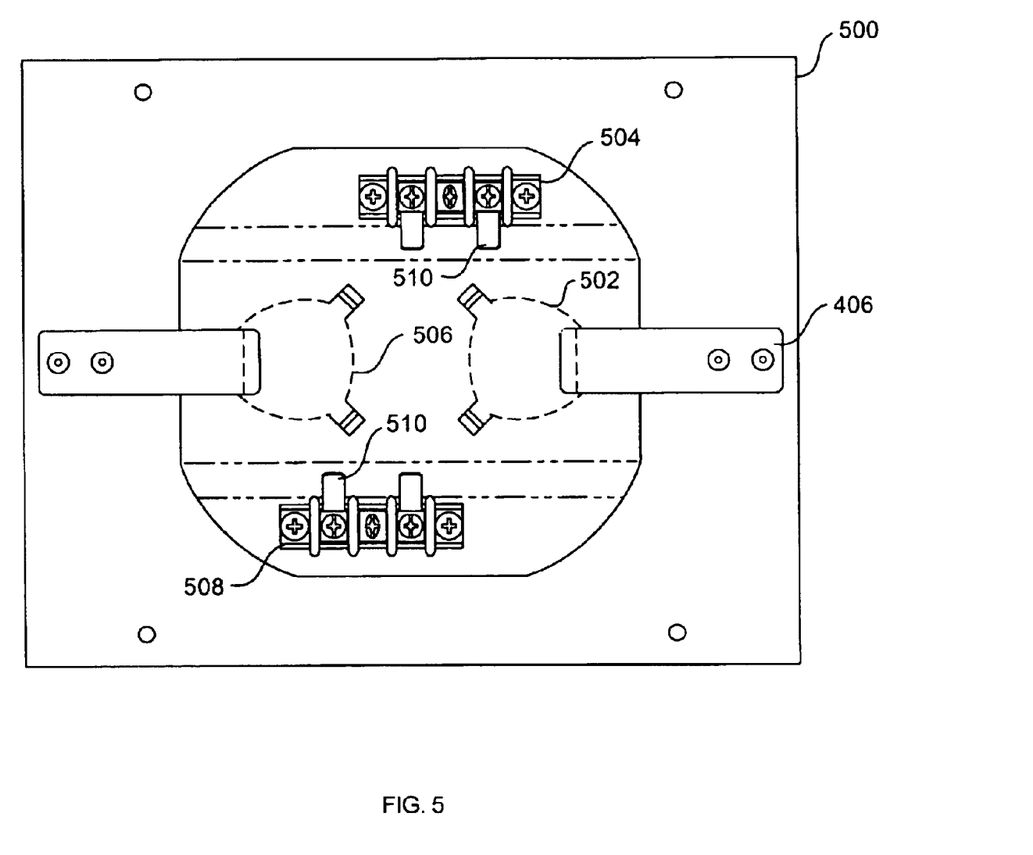
FIG. 5 illustrates a top-down view of a lamp mounting assembly.

Referring now to FIG. 5, there is illustrated a top-down view of a lamp mounting assembly 500. The lamp mounting assembly 500 accommodates the lamps (166 and 118), and associated wiring terminals for connecting power thereto. The first lamp 116 if fitted into a first lamp slot 502, and wired to a first lamp terminal strip 504. Similarly, the second lamp 118 is fitted into a second lamp slot 506, and wired to a second lamp terminal strip 508. Terminal connections for both lamps (116 and 118) can be accommodated using a spade lug type of connector 510 for ease of connecting or disconnecting the lamps (116 and 118). Alternatively, as illustrated, the wired connections can be screwed into the terminal strips (504 and 508) for a more secure connection. Power connections to the terminal strips are not shown, but such power conducting wires would be screwed down to the strips (504 and 508).

Also illustrated in a cutaway fashion, is the mating bracket 406 for the tool-free cover 120. Once the cover 120 is removed, the technician can simply reach in and replace one or both lamps, as required, and easily screw down the cover 120.

Figure 6:
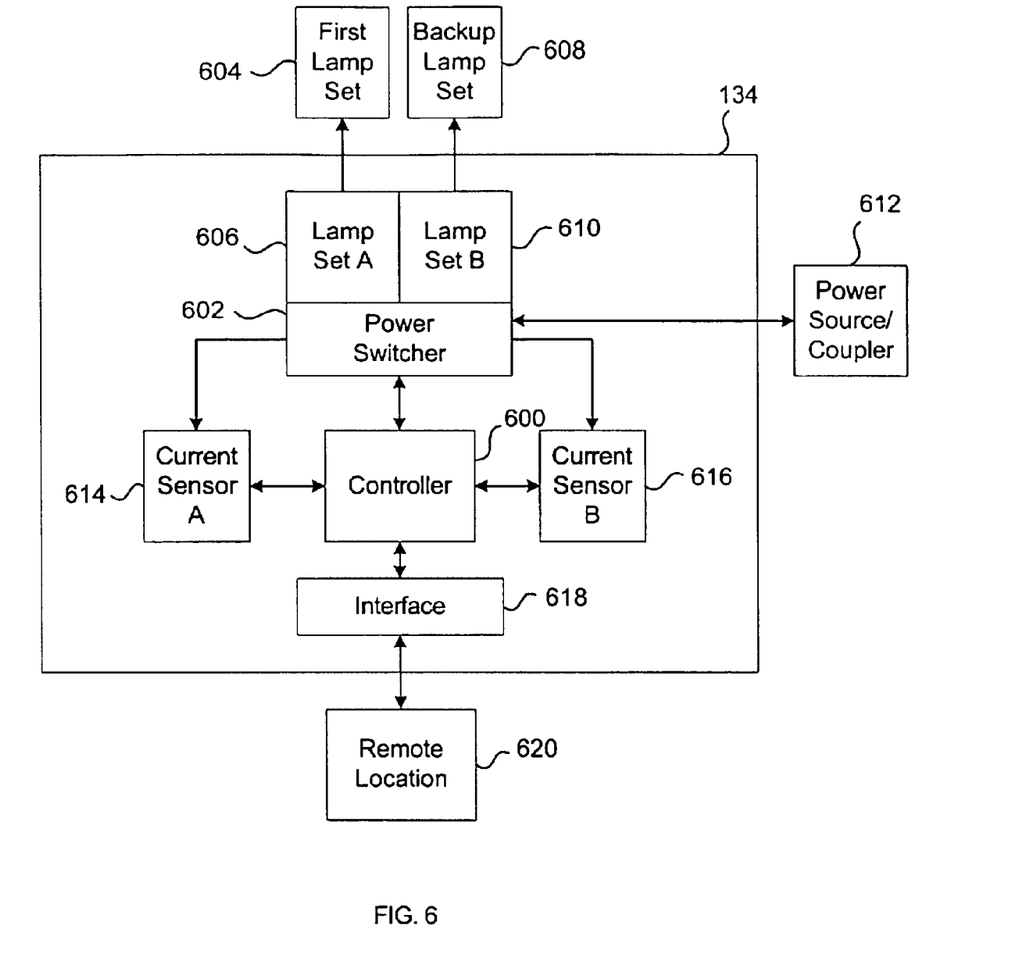
FIG. 6 illustrates a general block diagram of the power and control module.

Referring now to FIG. 6, there is illustrated a general block diagram of the power and control module 134. As indicated hereinabove, the power module 134 controls two sets of redundant lamps. The power module and control module 134 includes a controller 600 to control all on-board operations. The controller 600 connects to a power switching circuit 602 to control switching of power between the two redundant sets of lamps. In this illustration, the first set of lamps 604 connects to a Lamp Set A power interface connection 606, and the second set of lamps 608 connects to a Lamp Set B power interface connection 610. The power switcher 602 connects to a raw power coupler block 612 such that the controller 600 can control the power switcher 602 to route power accordingly. In order to automatically switch between the two sets of lamps, the power module and control module 134 includes at least one current sensor 614 to sense the amount of current being utilized for the respective lamp circuit. Thus, if the current draw on the sensed lamp circuit falls below or exceeds predetermined limits; the controller 600 can automatically switch off the measured circuit, and switch in the remaining circuit. It is appreciated that a second sensing circuit 616 can be implemented to measure the current load of the backup circuit 608 for Lamp Set B, once enabled.

Additionally, the power module and control module 134 can include a communication interface 618 operatively connected to the controller 600 to facilitate communication to a remote station 620. Thus when the first lamp set 604 has a lamp that fails, the controller 600 automatically switches over to the backup lamp set 608, and can also send a signal to the remote station 620 that alerts a technician of the need to check on the failed first lamp set 604. Note that the interface 618 can facilitate a wireless communication transceiver to wirelessly transmit data to the remote location 620, or a hardwired implementation utilizing a separate wire or signals over the power conductors, as provided in conventional technologies.

Although the preferred embodiment has been described in detail, it should be understood that various changes, substitutions, and alterations can be made therein without departing from the spirit and scope of the invention as defined by the appended claims.

What is claimed is:

1. An airfield guidance sign system comprising:
    a case having an interior surface composed of light reflecting material;
    a light source attached to the case for a light into the interior of the case;
    a light dispersion subsystem positioned within the case for dispersing the light from the light source substantially uniformly throughout the interior of the case, the light dispersion subsystem including,
        a light refractor attached to the interior of the case for distributing the light from the light source through the interior of the case; and
        at least one diffuser panel positioned in close proximity to the light source for diffusing the light therefrom, and,
    a side panel forming a side of the case for displaying information;
    wherein the case is modular in construction such that when utilizing multiple cases to form a multi-case sign, respective side panels include different information displayed thereon, and which respective side panels are translucent so that the light dispersed substantially uniformly throughout the interior of the multi-case sign provides corresponding uniformly lighted side panels when viewing the different information from the outside of the multi-case sign.

2. The system of claim 1, further comprising a power module far providing power to the light source and a control module for controlling the power to the light source, which control module automatically switches the power from a first light element of the light source to a second light element of the light source when the first light element fails.

3. The system of claim 1, wherein the control module automatically sends a signal to a remote location when the first light element fails.

4. A method of providing a sign, comprising the steps of:
providing a case having a side panel;
emitting light into the interior of the case with a light source; and
dispersing the light from the light source substantially uniformly throughout the interior of the case with a light dispersing subsystem including,
a light refractor attached to the interior of the case for distributing the light from the light source through the interior of the case, and
at least one diffuser panel positioned in close proximity to the light source for diffusing the light therefrom:
wherein the case in the step of providing is modular in construction such that when utilizing multiple cases to form a multi-case sign, respective side panels include different information displayed thereon, and which respective side panels are translucent so that the light dispersed substantially uniformly throughout the interior of the multi-case sign provides corresponding uniformly lighted side panels when viewing the different information from the outside of the multi-case sign.

5. The method of claim 4, further comprising a power module for providing power to the light source and a control module for controlling the power to the light source, which control module automatically switches the power from a first light element of the light source to a second light element of the light source when the first light element fails.

6. The method of claim 5, wherein the control module automatically sends a signal to a remote location when the first light element falls.

7. An airfield guidance sign system, comprising:
a case;
a multi-element light source attached to the case for providing light interior to the case;
a light dispersion subsystem of the case for dispersing the light from the light source substantially uniformly throughout the interior of the case; and
a side panel forming a side of the case for displaying information;
wherein the case is modular in construction so that when a plurality of cases are utilized to construct a multi-case sign, each additional case of the multi-case sign increases the number of support legs by no more than one.

8. The system of claim 7, wherein the light source includes a first light element operatively connected to a power switcher circuit, and second light element operatively connected to the power switcher circuit, such that the power switcher circuit operates to power the second light element when the first light element fails.

9. The system of claim 7, wherein the light source includes a parabolic reflector lamp.

10. The system of claim 7, wherein the light source comprises two separate light packages, each attached to the case to provide light to the interior thereof.

11. The system of claim 7, wherein the case has attached thereto at least one elevating support leg for supporting the case above the surface of the ground.

12. The system of claim 7, wherein the case includes a tool-free access cover for providing access to the light source.

13. The system of claim 7, wherein the light dispersion subsystem includes a diffuser panel associated with the light source for diffusing the light emitted from the light source.

14. The system of claim 13, wherein the diffuser panel includes reflective material for reflecting light emitted from the light source.

15. The system of claim 13, wherein the diffuser panel is positioned between the light source and the side panel.

16. The system of claim 7, wherein the light dispersion subsystem includes two diffuser panels suspended under and on either side of the light source, each diffuser panel including reflective material for reflecting the light emitted from the light source.

17. The system of claim 7, wherein the light dispersion subsystem includes a refractor associated with the light source for distributing the light from the light source throughout the interior of the case.

18. The system of claim 17, wherein the refractor has a surface that is multi-angled.

19. The system of claim 7, wherein the light dispersion subsystem includes a mirror positioned in the case for reflecting the light.

20. The system of claim 7, further comprising a power module for providing power to the light source, and switching power between first and second light elements of the light source.

21. The system of claim 20, wherein the power module includes a power-sensing element for measuring power being supplied to the light source so that when the first light element falls, the second light element automatically has power switched thereto.

22. The system of claim 21, wherein the power module includes a communication interface for communicating to a remote location such that when the first light element fails, the power module sends a signal to the remote location indicating that the first light element failed.

23. The system of claim 7, wherein the case is modular in construction such that when utilizing multiple cases to form a multi-case sign, respective side panels include different information displayed thereon.

24. The system of claim 7, wherein the side panel is translucent so that the light dispersed substantially uniformly throughout the interior of the case presents the side panel as correspondingly uniformly lighted when viewed from outside of the case.

25. An airfield guidance sign system, comprising:
a case;
a multi-element light source attached to the case for providing light interior to the case;
a light dispersion subsystem of the case for dispersing the light from the light source substantially uniformly throughout the interior of the case; and
a side panel forming a side of the case for displaying information;
wherein the case is modular in construction such that when utilizing multiple cases to form a multi-case sign, top and bottom case frames are changed to accommodate additional cases, respective side panels include different information displayed thereon.

26. The system of claim 25, wherein the light source includes a first light element operatively connected to a power switcher circuit, and second light element operatively connected to the power switcher circuit, such that the power switcher circuit operates to power the second light element when the first light element fails.

27. The system of claim 25, wherein the light source includes a parabolic reflector lamp.

28. The system of claim 25, wherein the light source comprises two separate light packages, each attached to the case to provide light to the interior thereof.

29. The system of claim 25, wherein the case has attached thereto at least one elevating support leg for supporting the case above the surface of the ground.

30. The system of claim 25, wherein the case includes a tool-free access cover for providing access to the light source.

31. The system of claim 25, wherein the light dispersion subsystem includes a diffuser panel associated with the light source for diffusing the light emitted from the light source.

32. The system of claim 31, wherein the diffuser panel includes reflective material for reflecting light emitted from the light source.

33. The system of claim 31, wherein the diffuser panel is positioned between the light source and the side panel.

34. The system of claim 25, wherein the light dispersion subsystem includes two diffuser panels suspended under and on either side of the light source, each diffuser panel including reflective material for reflecting the light emitted from the light source.

35. The system of claim 25, wherein the light dispersion subsystem includes a refractor associated with the light source for distributing the light from the light source throughout the interior of the case.

36. The system of claim 35, wherein the refractor has a surface that is multi-angled.

37. The system of claim 25, wherein the light dispersion subsystem includes a mirror positioned in the case for reflecting the light.

38. The system of claim 25, further comprising a power module for providing power to the light source, and switching power between first and second light elements of the light source.

39. The system of claim 38, wherein the power module includes a power-sensing element for measuring power being supplied to the light source so that when the first light element fails, the second light element automatically has power switched thereto.

40. The system of claim 39, wherein the power module includes a communication interface for communicating to a remote location such that when the first light element fails, the power module sends a signal to the remote location indicating that the first light element failed.

41. The system claim 25, wherein the case is modular in construction so that when a plurality of cases are utilized to construct multi-case sign, each additional case of the multi-case sign increases the number of support legs by no more than one.

42. The system of claim 25, wherein the side panel is translucent so that the light dispersed substantially uniformly throughout the interior of the case presents the side panel as correspondingly uniformly lighted when viewed from outside of the case.

43. A method of providing an airfield guidance sign, comprising the steps of:
providing a case having a side panel;
emitting light into the interior of the case with a multi-element light source;
dispersing the light from the light source throughout the interior of the case with a light dispersing subsystem,
wherein the side panel is perceived as substantially uniformly lighted when viewed from outside of the case;
wherein the case is modular in construction so that when a plurality of cases are utilized to construct a multi-case sign, each additional case of the multi-case sign increases the number of support legs by no more than one.

44. The method of claim 43, wherein the light source in the step of emitting includes first and second light elements, the first light element operatively connected to a first power circuit, and the second light element operatively connected to a second power circuit, such that the first power circuit operates to power the first light element when the second light element fails.

45. The method of claim 43, further comprising the step of elevating the case above the surface of the ground with at least one adjustable support leg.

46. The method of claim 43, further comprising the step of accessing the light source of the case via a tool-free access cover.

47. The method of claim 43, wherein the light dispersion subsystem in the step of dispersing includes a diffuser panel associated with the light source for diffusing tie light emitted from the light source.

48. The method of claim 43, wherein the diffuser panel is positioned between the light source and the side panel, and includes reflective material for reflecting light emitted from the light source.

49. The method of claim 43, wherein the light dispersion subsystem in the step of dispersing includes two diffuser panels suspended under and on either side of the light source, each diffuser panel including reflective material for reflecting the light emitted from the light source.

50. The method of claim 43, wherein the light dispersion subsystem in the step of dispersing includes a refractor associated with the light source for distributing the light from the light source throughout the interior of the case.

51. The method of claim 43, wherein the refractor has a surface that is multi-angled.

52. The method of claim 43, wherein the light dispersion subsystem in the step of dispersing includes a mirror positioned in the case for reflecting the light.

53. The method of claim 43, further comprising the step of powering the light source, and switching the power between first and second light elements of the light source with a control module.

54. The method of claim 53, wherein the control module includes a power-sensing element for sensing the power supplied to the first and second light elements so that when the first light element fails, the control module automatically switches power to the second light element.

55. The method of claim 54, wherein the control module includes a communication interface for communicating to a remote location such that when the first light element fails, the control module sends a signal to the remote location indicating that the first light element felled.

56. The method of claim 43, wherein the case is modular in construction such that when utilizing multiple cases to form a multi-case sign, respective side panels include different information displayed thereon.

57. A method of providing an airfield guidance sign, comprising the steps of:
providing a case having a side panel;
emitting light into the interior of the case with a multi-element light source;
dispersing the light from the light source throughout the interior of the case with a light dispersing subsystem, wherein the side panel is perceived as substantially uniformly lighted when viewed from outside of the case;

wherein the case is modular in construction such that when utilizing multiple cases to form a multi-case sign, top and bottom case frames are changed to acommodate additional cases, respective side panels include different information displayed thereon.

58. The method of claim 57, wherein the light source in the step of emitting includes first and second light elements, the first light element operatively connected to a first power circuit, and the second light element operatively connected to a second power circuit, such that the first power circuit operates to power the first light element when the second light element falls.

59. The method of claim 57, further comprising the step of elevating the case above the surface of the ground with at least one adjustable support leg.

60. The method of claim 57, further comprising the step of accessing the light source of the case via a tool-free access cover.

61. The method of claim 57, wherein the light dispersion subsystem in the step of dispersing includes a diffuser panel associated with the light source for diffusing the light emitted from the light source.

62. The method of claim 61, wherein the diffuser panel is positioned between the light source and the side panel, and includes reflective material for reflecting light emitted from the light source.

63. The method of claim 57, wherein the light dispersion subsystem in the step of dispersing includes two diffuser panels suspended under and on either side of the light source, each diffuser panel including reflective material for reflecting the light emitted from the light source.

64. The method of claim 57, wherein the light dispersion subsystem in the step of dispersing includes a refractor associated with the light source for distributing the light from the light source throughout the interior of the case.

65. The method of claim 64, wherein the refractor has a surface that is multi-angled.

66. The method of claim 57, wherein the light dispersion subsystem in the step of dispersing includes a mirror positioned in the care for reflecting the light.

67. The method of claim 57, further comprising the step of powering the light source, and switching the power between first and second light elements at the light source with a control module.

68. The method of claim 67, wherein the control module includes a power-sensing element for sensing the power supplied to the first and second light elements so that when the first light element fails, the control module automatically switches power to the second light element.

69. The method of claim 67, wherein the control module includes a communication interface for communicating to a remote location such that when the first light element fails, the control module sends a signal to the remote location indicating that the first light element failed.

70. The method of claim 57, wherein the case is modular in construction so that when a plurality of cases are utilized to construct a multi-case sign, each additional case of the multi-case sign increases the number of support legs by no more than one.

* * * * *